United States Patent
Yao et al.

(10) Patent No.: US 7,218,482 B2
(45) Date of Patent: May 15, 2007

(54) MICRO-ACTUATOR, HEAD GIMBAL ASSEMBLY AND MANUFACTURING METHOD THEREOF

(75) Inventors: Ming Gao Yao, Dongguan (CN); Masashi Shiraishi, Hong Kong (CN)

(73) Assignee: Sae Magnetics (H.K.) Ltd. (CN)

( * ) Notice: Subject to any disclaimer, the term of this patent is extended or adjusted under 35 U.S.C. 154(b) by 543 days.

(21) Appl. No.: 10/763,327

(22) Filed: Jan. 26, 2004

(65) Prior Publication Data

US 2005/0162783 A1 Jul. 28, 2005

(51) Int. Cl.
*G11B 5/56* (2006.01)
(52) U.S. Cl. .................................... 360/294.4
(58) Field of Classification Search .............. 360/294.4
See application file for complete search history.

(56) References Cited

U.S. PATENT DOCUMENTS

| | | | |
|---|---|---|---|
| 6,381,104 B1* | 4/2002 | Soeno et al. ............. | 360/294.4 |
| 6,614,627 B1* | 9/2003 | Shimizu et al. .......... | 360/294.4 |
| 6,618,220 B2 | 9/2003 | Inagaki et al. | |
| 6,621,661 B1 | 9/2003 | Ichikawa et al. | |
| 6,653,761 B2* | 11/2003 | Fujii et al. .................. | 310/333 |
| 6,680,810 B2 | 1/2004 | Shiraishi et al. | |
| 6,690,551 B2 | 2/2004 | Shiraishi et al. | |
| 6,700,749 B2 | 3/2004 | Shiraishi et al. | |
| 6,728,077 B1* | 4/2004 | Murphy .................... | 360/294.4 |
| 6,747,848 B2 | 6/2004 | Kasajima et al. | |
| 6,751,069 B2* | 6/2004 | Yao et al. ................. | 360/294.4 |
| 6,771,131 B2 | 8/2004 | Wilson et al. | |
| 6,775,107 B2 | 8/2004 | Kasajima et al. | |
| 6,791,783 B2* | 9/2004 | Nakagawa .................... | 360/75 |
| 6,930,860 B1* | 8/2005 | Coffey ...................... | 360/294.4 |
| 2001/0004303 A1 | 6/2001 | Wada et al. | |
| 2002/0027741 A1* | 3/2002 | Koganezawa ............ | 360/78.12 |
| 2002/0126420 A1 | 9/2002 | Yao et al. | |
| 2003/0005574 A1 | 1/2003 | Kasajima et al. | |
| 2003/0036870 A1 | 2/2003 | Kim | |
| 2003/0123196 A1* | 7/2003 | Shiraishi et al. .......... | 360/294.4 |
| 2003/0133230 A1* | 7/2003 | Hida et al. ................ | 360/294.4 |
| 2003/0135985 A1 | 7/2003 | Yao et al. | |
| 2003/0147177 A1 | 8/2003 | Yao et al. | |

(Continued)

FOREIGN PATENT DOCUMENTS

JP 2003-246841 5/2003

(Continued)

*Primary Examiner*—Allen Cao
(74) *Attorney, Agent, or Firm*—Kening Li

(57) ABSTRACT

A head gimbal assembly comprising a slider having a read\write sensor; a suspension to load the slider; a micro-actuator; wherein the micro-actuator comprises a piezoelectric unit with two piezoelectric elements and a support base having a base to be coupled with the suspension physically, a moving plate to be coupled with the two piezoelectric elements, and a leading beam to connect with the base and the moving plate. Also disclosed is a micro-actuator comprising inter alia a piezoelectric unit with two piezoelectric elements. A method of forming a micro-actuator is also disclosed, which method comprising forming a piezoelectric unit having two piezoelectric elements; forming a support base having a base, a moving plate, and a leading beam to connect with the base and the moving plate; and bonding the piezoelectric unit to one side of the support base. Also disclosed is a method of forming a slider, a suspension and a micro-actuator.

15 Claims, 15 Drawing Sheets

U.S. PATENT DOCUMENTS

| | | |
|---|---|---|
| 2003/0147181 A1 | 8/2003 | Shiraishi et al. |
| 2003/0168935 A1 | 9/2003 | Ogawa et al. |
| 2003/0196315 A1 | 10/2003 | Yao et al. |
| 2004/0022169 A1 | 2/2004 | Ichiwawa et al. |
| 2004/0037009 A1 | 2/2004 | Yao et al. |
| 2004/0070887 A1 | 4/2004 | Yao et al. |
| 2004/0085679 A1 | 5/2004 | Yao et al. |
| 2004/0095684 A1 | 5/2004 | Yao et al. |
| 2004/0125510 A1* | 7/2004 | Yang et al. .............. 360/294.4 |
| 2004/0140342 A1 | 7/2004 | Yao et al. |
| 2005/0195531 A1* | 9/2005 | Yamazaki et al. ....... 360/294.4 |
| 2005/0248887 A1* | 11/2005 | Shimizu et al. .......... 360/294.4 |
| 2006/0072247 A1* | 4/2006 | Yao et al. ................ 360/294.4 |
| 2006/0077594 A1* | 4/2006 | White et al. ............. 360/294.4 |

FOREIGN PATENT DOCUMENTS

| | | |
|---|---|---|
| JP | 2003-203449 | 7/2003 |
| JP | 2003-223155 | 8/2003 |
| JP | 2004-006877 | 8/2004 |

* cited by examiner

MICRO-ACTUATOR, HEAD GIMBAL ASSEMBLY AND MANUFACTURING METHOD THEREOF

FIELD OF THE INVENTION

The present invention relates to a disk drive unit and manufacturing method thereof, and more particularly to a micro-actuator and a head gimbal assembly and manufacturing method thereof.

BACKGROUND OF THE INVENTION

Disk drives are information storage devices that use thin film magnetic media to store data. Referring to FIGS. 1a and 1b, a typical disk drive in prior art has a drive arm 104 with a slider 203 mounted thereon and a magnetic disk 101. The disk 101 is mounted on a spindle motor 102 which causes the disk 101 to spin and a voice-coil motor (VCM) (not shown) is provided for controlling the motion of the drive arm 104 with the slider 203 and thus controlling the slider 203 to move from track to track across the surface of the disk 101 to read data from or write data to the disk 101.

However, Because of the inherent tolerance (dynamic play) resulting from VCM that exists in the placement of the slider 203, the slider 203 can not attain a position fine adjustment.

To solve the above-mentioned problem, piezoelectric (PZT) micro-actuators are now utilized to modify the placement of the slider. That is, the PZT micro-actuator corrects the placement of the slider on a much smaller scale to compensate for the tolerance of VCM and the drive arm 104. It not only enables a smaller recording track width, but also increases the 'tracks per inch' (TPI) value and the surface recording density of the disk drive.

Referring to FIGS. 1c, 1d, a traditional PZT micro-actuator 205 has a ceramic U-shaped frame 297. The U-shaped frame 297 comprises two ceramic beams 207 with two PZT pieces (not shown) on each side thereof. The PZT micro-actuator 205 is physically coupled to a suspension 213, and there are three electrical connection balls 209 (gold ball bonding or solder bump bonding, GBB or SBB) to couple the micro-actuator 205 to the suspension traces 210 in one side of the ceramic beam 207. In addition, there are four balls 208 (GBB or SBB) to couple the slider 203 to the suspension 213 for electrical connection. FIG. 2 shows a detailed process of inserting the slider 203 into the micro-actuator 205. The slider 203 is bonded with the two ceramic beams 207 at two points 206 by epoxy dots 212 so as to make the motion of the slider 203 independent of the drive arm 104 (See FIG. 1a).

When power supply is applied through the suspension traces 210, the PZT micro-actuator 205 can expand or contract to cause the U-shaped frame 297 deform and then make the slider 203 rotate along a radial direction on the disk 101. Thus a position fine adjustment can be attained.

However, a head gimbal assembly (HGA) 277 (see FIG. 1c) with the micro-actuator 205 is very difficult to manufacture. First, inserting and bonding the slider 203 to the micro-actuator 205 is difficult. Secondly, the epoxy dot 212 is very difficult to control, if the length of the epoxy dot 212 is too long, it will affect the work performance of the micro-actuator 205, for example, the displacement is not enough; if the length of the epoxy dot 212 is too short, the bonding strength will not be enough and then the shock performance is poor. In addition, the height of the epoxy dot 212 is also difficult to control, if the epoxy dot 212 is too high, the epoxy dot 212 will stay on the front or back side of the slider 203. The epoxy dot 212 staying on the front side of the slider 203 will influence the slider 203 flying on the disk 101 and even damage the slider 203 or the disk 101; The epoxy dot 212 staying on the back side of the slider 203 will influence the GBB process of the slider 203.

Additionally, the micro-actuator 105 has an additional mass which not only influence the static performance, but also influence the dynamic performance of the suspension 213, such as the resonance performance, so as to reduce resonance frequency and increase the gain of the suspension 213.

Also, because the U-shaped frame 297 of the micro-actuator 205 is very brittle, it has a poor shock performance. In addition, it is also a big problem that there is no effective method to identify potential micro cracks of the U-shaped frame 297. Furthermore, due to the variations of voltage applied to the PZT micro-actuator, the back and forth bending of the brittle micro-actuator 205 will generate particles and influence the work performance of the micro-actuator 205.

In the manufacturing process of HGA 277, since the HGA 277 has a complex configuration, the slider 203 must tilt during the bonding of the slider 203 to the U-shaped frame 297, and the U-shaped frame 297 must tilt during the bonding of the U-shaped frame 297 with the slider 203 to the suspension 213. Both will influence the static attitude of the HGA 277 and accordingly increase the difficulty of manufacturing the HGA 277.

It is well known that polishing is a more effective and widely used cleaning method for the micro contamination in the air bearing surface (ABS) of the slider. However, this cleaning method cannot be used in the above-mentioned HGA 277 because it is easy to damage the U-shaped frame 297 of the micro-actuator 205.

Finally, since the slider 203 is supported by the ceramic U-shaped frame 297, it is difficult to ground the slider 203 and suspension to get an electro static discharge (ESD) protection. Also, it is a waste of energy that a bigger drive voltage (40V, AC p—p) is required for operate the PZT micro-actuator 205.

Hence it is desired to provide a micro-actuator, head gimbal assembly and manufacturing method thereof which can overcome the foregoing drawbacks of the prior art.

SUMMARY OF THE INVENTION

A main feature of the present invention is to provide a micro-actuator, head gimbal assembly and manufacturing method thereof.

To achieve the above-mentioned feature, a head gimbal assembly of the present invention comprises a slider having a read\write sensor, a suspension to load the slider and a micro-actuator. The micro-actuator comprises a piezoelectric unit with two piezoelectric elements and a support base having a base to be coupled with the suspension physically, a moving plate to be coupled with the two piezoelectric elements, and a leading beam to connect with the base and the moving plate.

In the present invention, the base, the moving plate and the leading beam are made from one piece of seamless material, and the seamless material is preferably metal. In addition, the leading beam has a structure to assist a horizontal movement of the moving plate and the width of the leading beam is narrower than that of the moving plate. The two piezoelectric elements are two thin film piezoelectric pieces or ceramic piezoelectric pieces. A plurality of electrical pads is formed on each of the two piezoelectric elements. In an embodiment of the present invention, the two piezoelectric elements have three electrical pads consisting of two voltage-applied pads and a ground pad shared by the two piezoelectric elements. The suspension comprises a flexure having a suspension tongue, the suspension tongue has a plurality of electrical pads disposed on a predetermined position thereof corresponding to the electrical pads on the two piezoelectric elements. The base of the micro-actuator electrically couples with the electrical pads and physically couples with the flexure by anisotropic conductive film. The moving plate of the support base physically and electrically couple with the slider by anisotropic conductive film or adhesive bonding.

A micro-actuator of the present invention comprises a piezoelectric unit with two piezoelectric elements and a support base. The metal support base has a base, a moving plate to be coupled with the two piezoelectric elements, and a leading beam to connect with the base and the moving plate. In the present invention, the base, the moving plate and the leading beam are made from one piece of seamless material, and the seamless material is preferably metal. In addition, the leading beam has a structure to assist a horizontal movement of the moving plate and the width of the leading beam is narrower than that of the moving plate. The two piezoelectric elements are two thin film piezoelectric pieces or ceramic piezoelectric pieces. A plurality of electrical pads are formed on each of the two piezoelectric elements. In an embodiment of the present invention, the two piezoelectric elements have three electrical pads consisting of two voltage-applied pads and a ground pad shared by the two piezoelectric elements.

A method of forming a head gimbal assembly of the present invention comprises the steps of: (A) forming a slider, a suspension and a micro-actuator having two piezoelectric elements and a support base which has a base, a moving plate, and a leading beam to connect with the base and the moving plate; (B) coupling the micro-actuator physically and electrically with the slider by anisotropic conductive film or adhesive bonding; (C) electrically bonding the slider to the suspension by GBB or SBB.

In the present invention, forming a micro-actuator comprises: (1) forming a piezoelectric unit having two piezoelectric elements; (2) forming a support base having a base, a moving plate, and a leading beam to connect with the base and the moving plate, and (3) bonding the piezoelectric unit being to one side of the support base. In the present invention, step (2) comprises the following steps: (a) forming a set of the support bases; and (b) dividing the set of the support bases into a single support base. Step (a) can be performed by die punching a raw sheet to a set of the support bases; or performed by: forming a multi-layer sheet comprising raw sheet and spacer sheet alternately; and then cutting the multi-layer sheet to a set of the support bases; or performed by molding a bulk of support base bars consisted of a set of the support bases.

Compared with the traditional ceramic U-shaped frame, the micro-actuator of the present invention provides a new design of the support base made of metal. Using the metal support base will greatly improve the shock performance of the micro-actuator and solve the problem of generating dust particles.

Due to its complex manufacturing process, it is difficult to control the static attitude in the prior art, the present invention can provide a similar manufacturing process as the traditional HGA method but is much better for the HGA static attitude control or using the traditional method to control it.

The invention is also better for the particle contamination control in the manufacturing process. In addition, the traditional polishing cleaning method can be used for the cleaning process of the present invention. Furthermore, because the ACF bonding is used for slider mounting, it makes the grounding process much easier, and the ACF is easy to salvage and recycle. Finally, the present invention can also reduce the voltage of operating the thin film PZT micro-actuator and achieve the same displacement as the prior art micro-actuator.

For the purpose of making the invention easier to understand, several particular embodiments thereof will now be described with reference to the appended drawings in which:

DESCRIPTION OF THE DRAWINGS

FIG. 1b is an enlarged, partial view of FIG. 1a.
FIG. 3b is an exploded, perspective view of the HGA of FIG. 3a.
FIG. 3c is a perspective view of a suspension of the HGA of FIG. 3a.
FIG. 4c is an enlarged, partial view of FIG. 3a.

DETAILED DESCRIPTION OF THE INVENTION

Figure 1A:
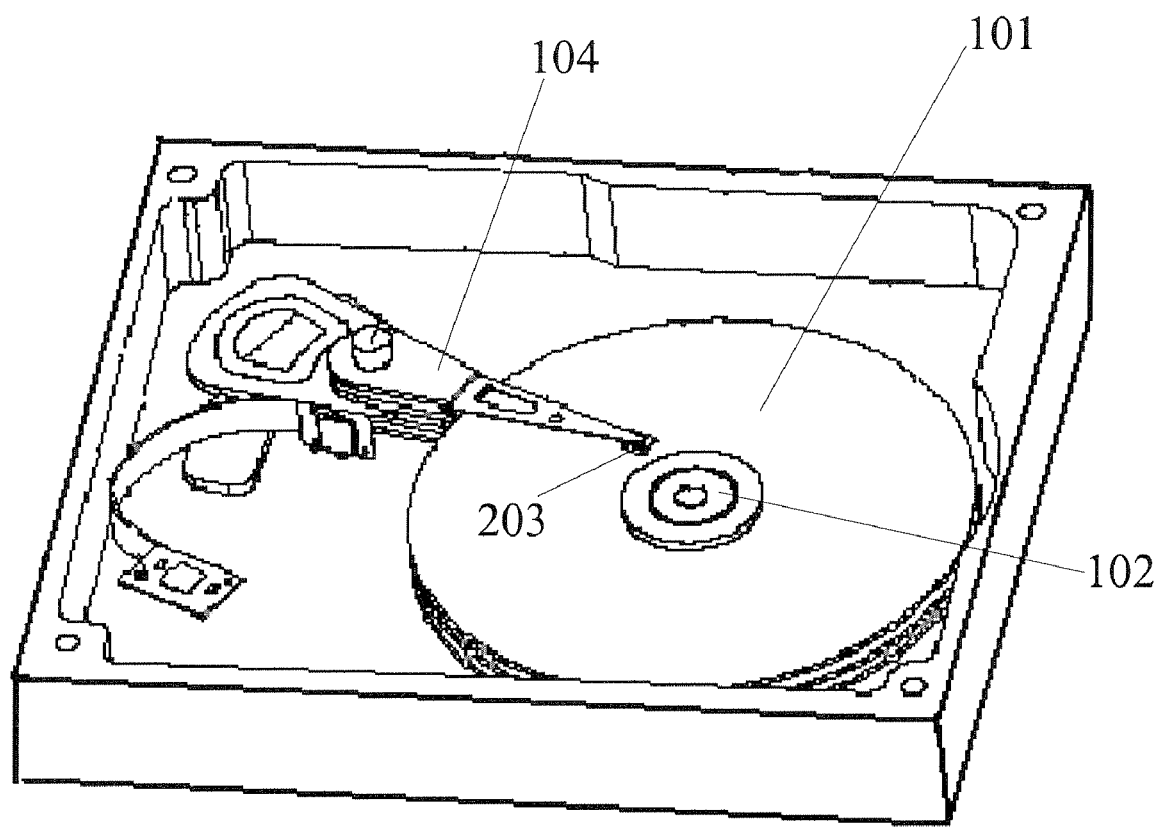
FIG. 1a is a perspective view of a traditional disk drive.
Figure 1B:
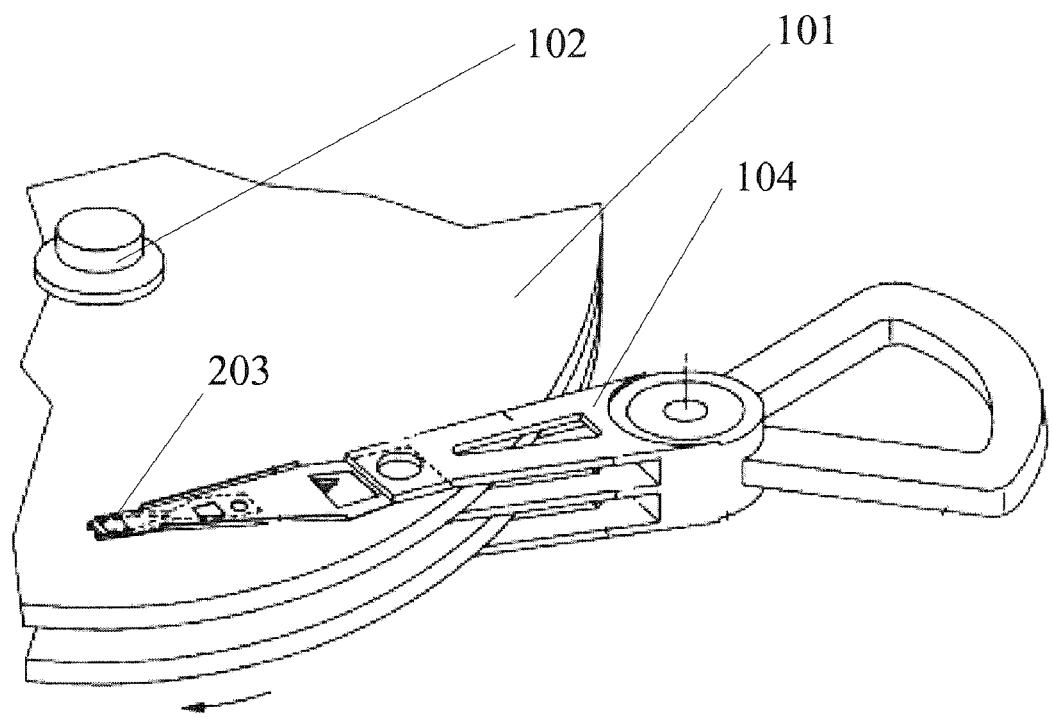
Figure 1C:
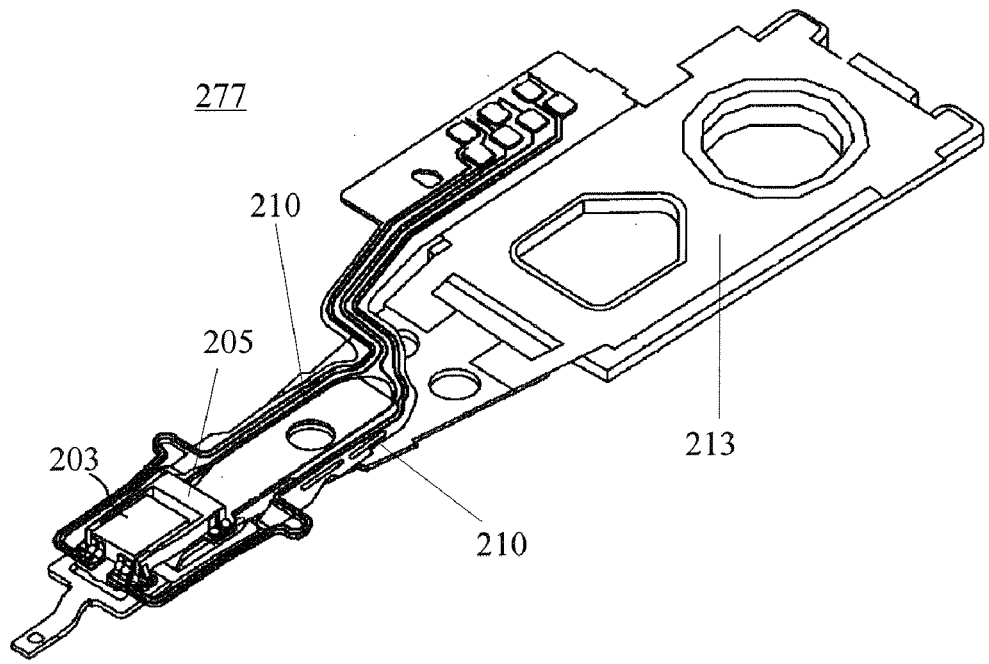
FIG. 1c is a perspective view of a HGA of prior art.
Figure 1D:
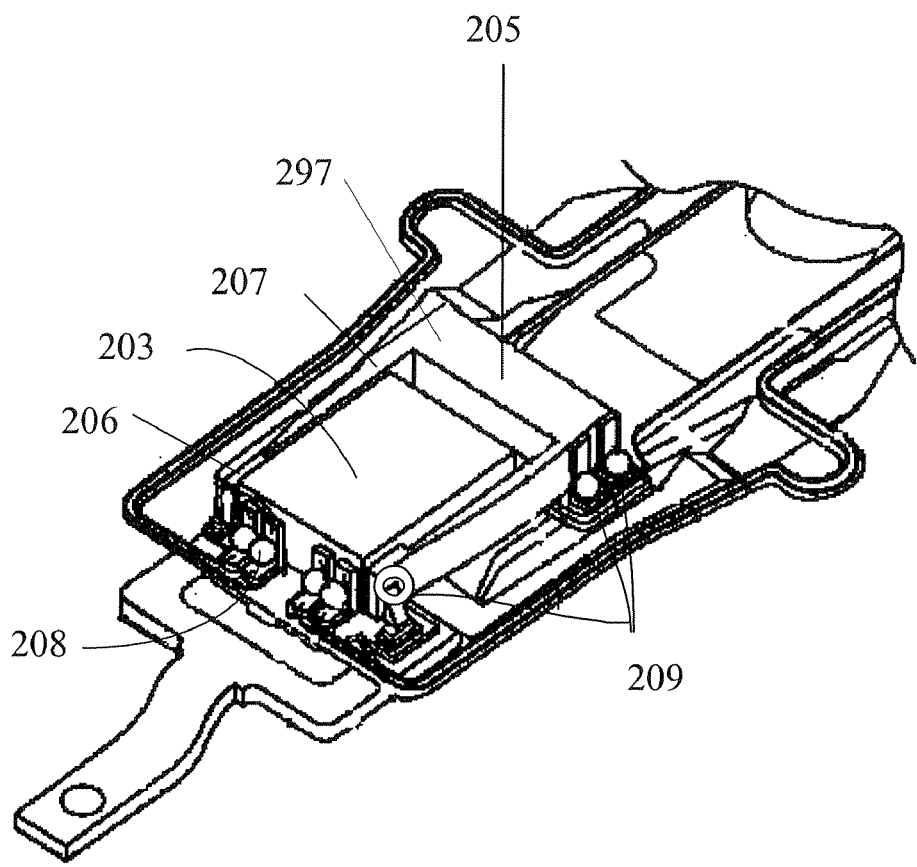
FIG. 1d is an enlarged, partial view of FIG. 1c.
Figure 2:
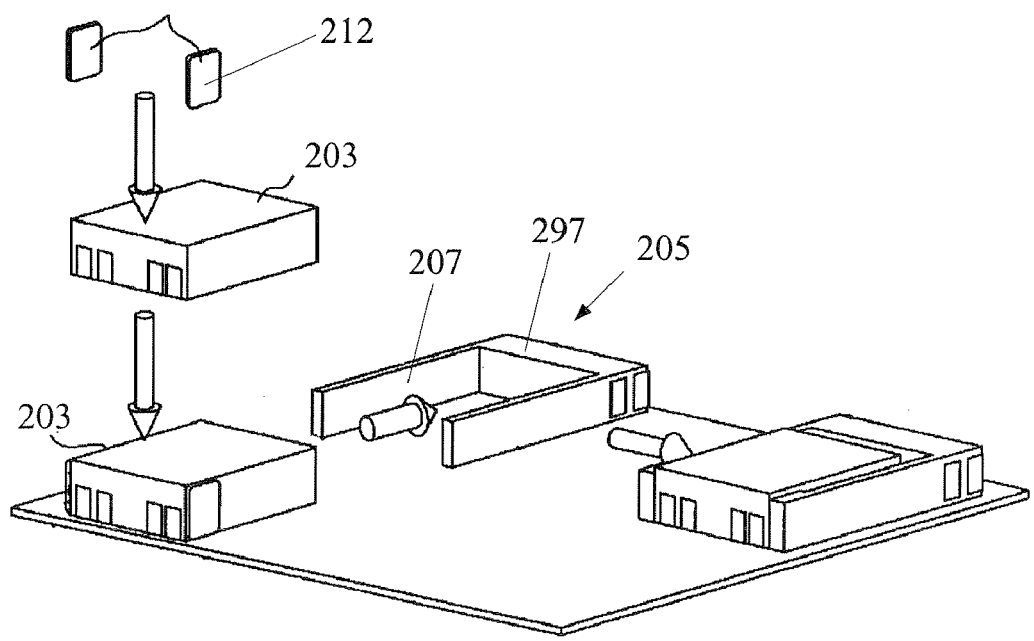
FIG. 2 shows a detailed process of inserting a slider to a micro-actuator of the HGA of FIG. 1c.
Figure 3A:
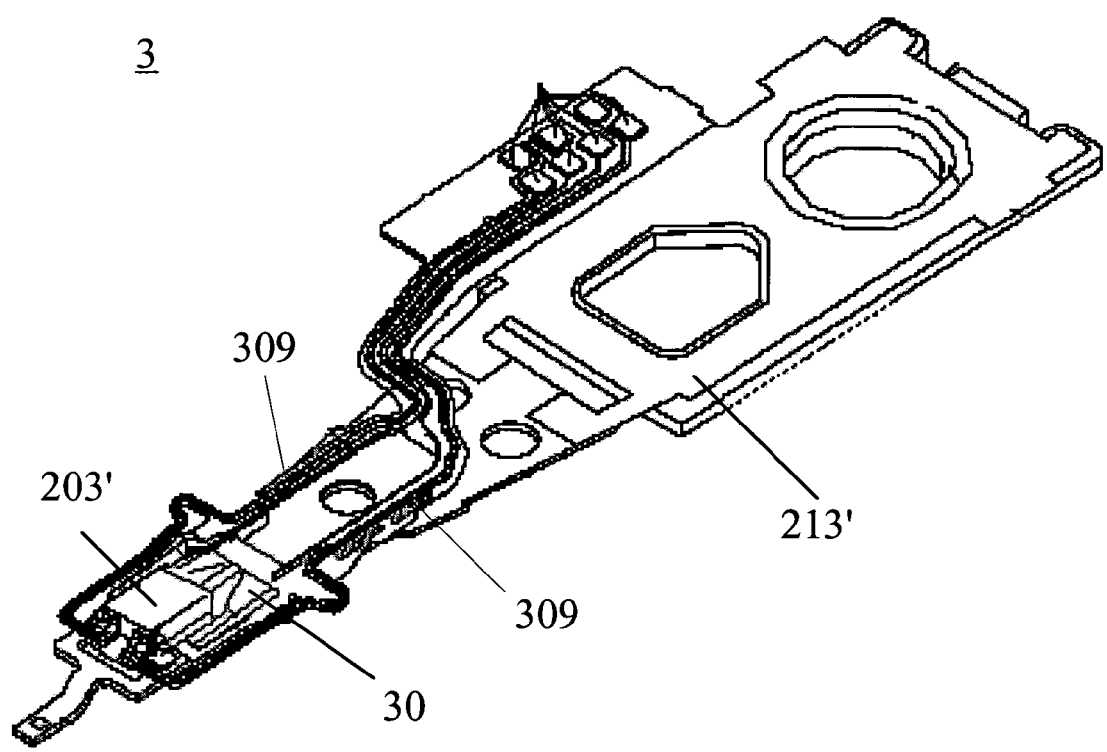
FIG. 3a is a perspective view of a HGA according to the present invention.

Referring to FIG. 3a, a head gimbal assembly (HGA) 3 of the present invention comprises a slider 203', a micro-actuator 30 and a suspension 213'.

Figure 3B:
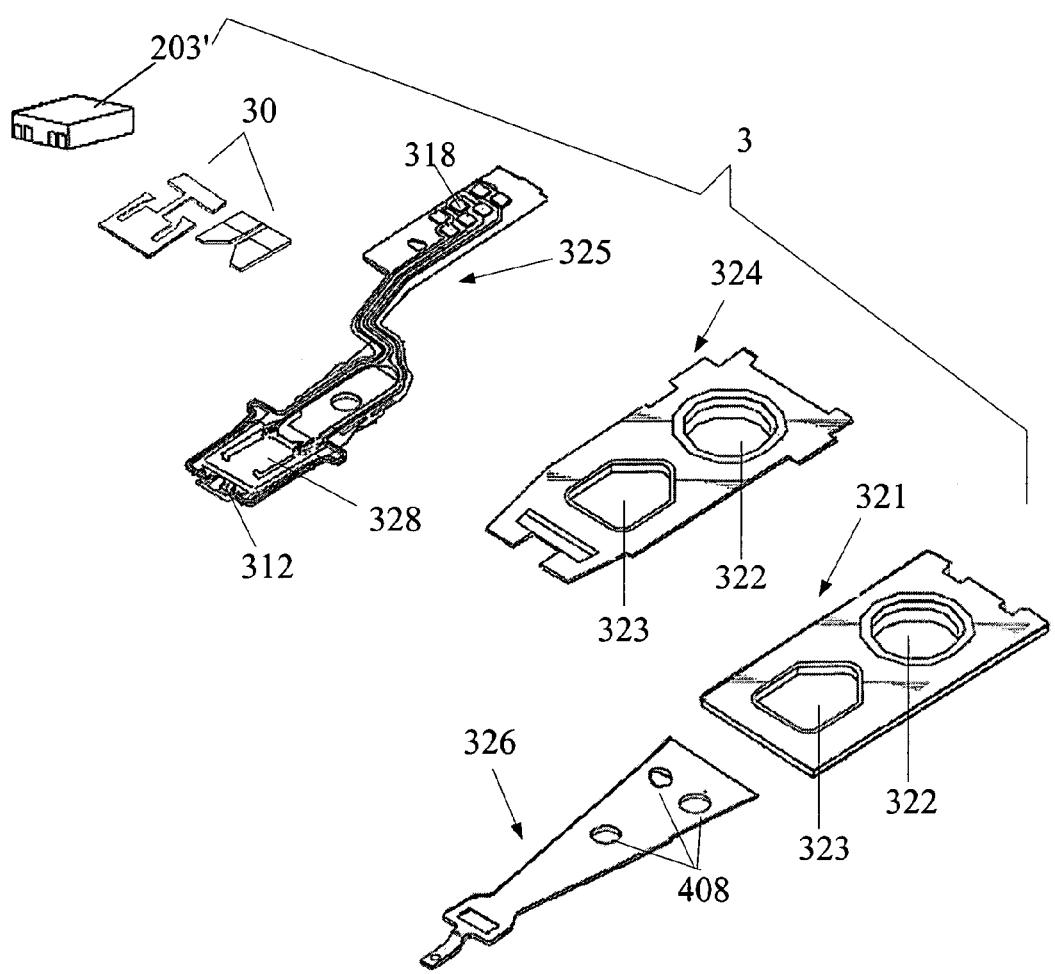
Figure 4A:
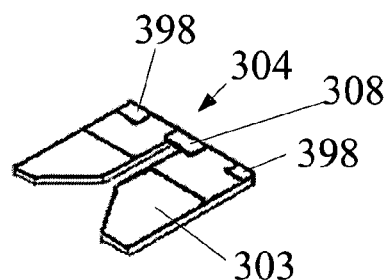
FIG. 4a is a perspective view of a PZT unit of a micro-actuator according to an embodiment of the present invention.
Figure 4B:
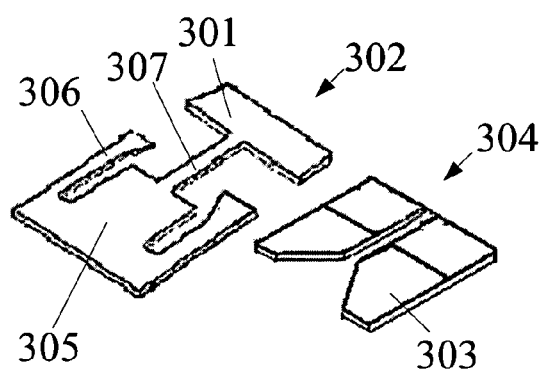
FIG. 4b shows a micro-actuator having the PZT unit of FIG. 4a according to an embodiment of the present invention.
Figure 4C:
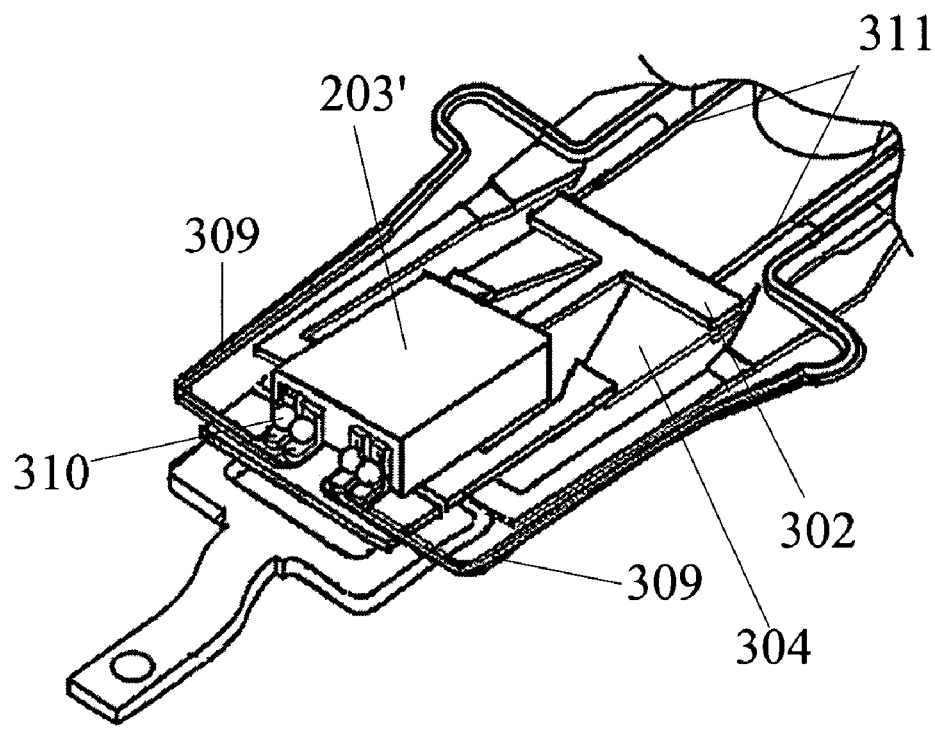

Referring to FIG. 3b, the slider 203' comprises a read\write sensor (not shown) embedded therein during fabrication. Referring to FIGS. 4a and 4b, the micro-actuator 30 comprises a metal support base 302 and a piezoelectric (PZT) unit 304. The PZT unit 304 comprises two thin film PZT pieces 303 and a plurality of electrical pads 308, 398 on one side thereof. Referring to FIGS. 4b–4c, the support base 302 comprises a base 301, a leading beam 307, a moving plate 305 with two side beams 306 in its both sides. In an embodiment of the invention, the width of the leading beam 307 is narrower than that of the moving plate 305. The PZT unit 304 physically couple with the support base 302 by a traditional method, such as adhesive bonding, and their tops are arranged in a line.

Figure 3C:
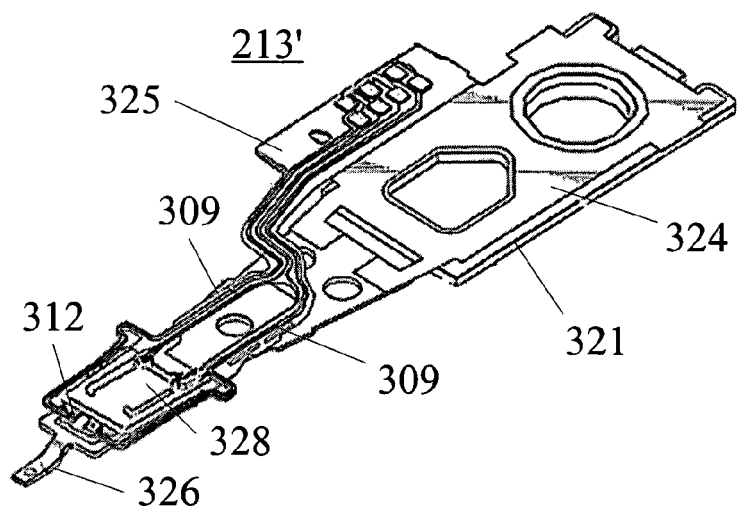
Figure 4D:
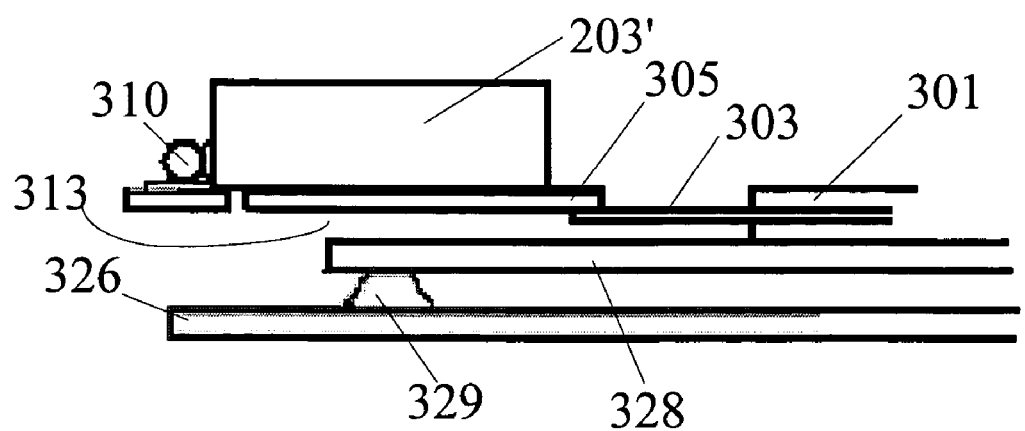
FIG. 4d is a cross-sectional view of the HGA of FIG. 3a in the micro-actuator area.

With reference to FIGS. 3b and 3c, the suspension 213' comprises a load beam 326, a flexure 325, a hinge 324 and a base plate 321. The load beam 326 has three openings 408 formed therein as lamination datum and a plurality of dimples 329 (see FIG. 4d) formed thereon as well. In the hinge 324 and the base plate 321 there are formed two holes 322 and 323, respectively. The hole 322 is used for swaging the HGA 3 and the drive arm (not shown) and the hole 323 is used to reduce the weight of the suspension 213'. On the flexure 325 a plurality of connection pads 318 are provided to connect with a control system (not shown) at one end and a plurality of electric multi-traces 309, 311 in the other end. Referring to FIGS. 3c and 4d, the flexure 325 also comprises a suspension tongue 328 which are used to support the micro-actuator 30 and keep the loading force always being applied to the center area of the slider 203' through the dimples 329 of the load beam 326. The suspension tongue 328 has a plurality of electrical pads (not shown) disposed on a predetermined position thereof corresponding to the electrical pads 308, 398 on the PZT unit 304. Through these electrical pads the suspension tongue 328 electrically connects with the PZT unit 304.

Referring to FIG. 4d, in the present invention, the micro-actuator 30 electrically and physically couples with the suspension tongue 328 of the flexure 325 by anisotropic conductive film (ACF). A parallel gap 313 is thus formed between the micro-actuator 30 and the suspension tongue 328 so as to ensure the smooth movement of the micro-actuator 30. At the same time, the moving plate 305 of the support base 302 physically and electrically couples with the slider 203' by ACF or adhesive bonding. The physical coupling can keep the slider 203' moving together with the micro-actuator 30 and the electrical coupling help to prevent electro static discharge (ESD) damage of the slider 203'. In the present invention, the length of the parallel gap 313 is preferably 35~50 μm.

Referring to FIGS. 3a and 4c, in the present invention, four metal balls 310 (GBB or SBB) are used to electrically connect the slider read/write sensor (not shown) with the two electric multi-traces 309 in moving part 312 of the suspension 213'. The PZT unit 304 on the suspension tongue 328 electrically connects with the electric multi-traces 311 through the electrical pads 398 by ACF or conductive adhesive, and the middle electrical pad 308 is a ground pad shared by the two thin film PZT piece 303. Through the electric multi-traces 309, 311, the connection pad 318 electrically connects the slider 203' and the micro-actuator 30 with the control system (not shown).

A method of forming the head gimbal assembly 3 according to the present invention comprises the steps of: (A) forming a slider 203', a suspension 213' and a micro-actuator 30 having two piezoelectric elements 303 and a metal support base 302 which has a base 301, a moving plate 305 to be coupled with the two piezoelectric elements 303, and a leading beam 307 to connect with the base 301 and the moving plate 305; (B) coupling the micro-actuator 30 physically and electrically with the slider 203' by anisotropic conductive film or adhesive bonding; and (C) electrically bonding the slider 203' to the suspension 213' by GBB or SBB.

In accordance with the present invention, a method of forming the micro-actuator 30 comprises the steps of: (1) forming a piezoelectric unit 304 having two piezoelectric elements 303; (2) forming a support base 302 having a base 301, a moving plate 305 to be coupled with the two piezoelectric elements 303, and a leading beam 307 to connect with the base 301 and the moving plate 305; and (3) bonding the piezoelectric unit 304 to one side of the support base 302.

Now several embodiments of a manufacturing process of the support base 302 will be described in detail as follows:

EMBODIMENT 1

Figure 5:
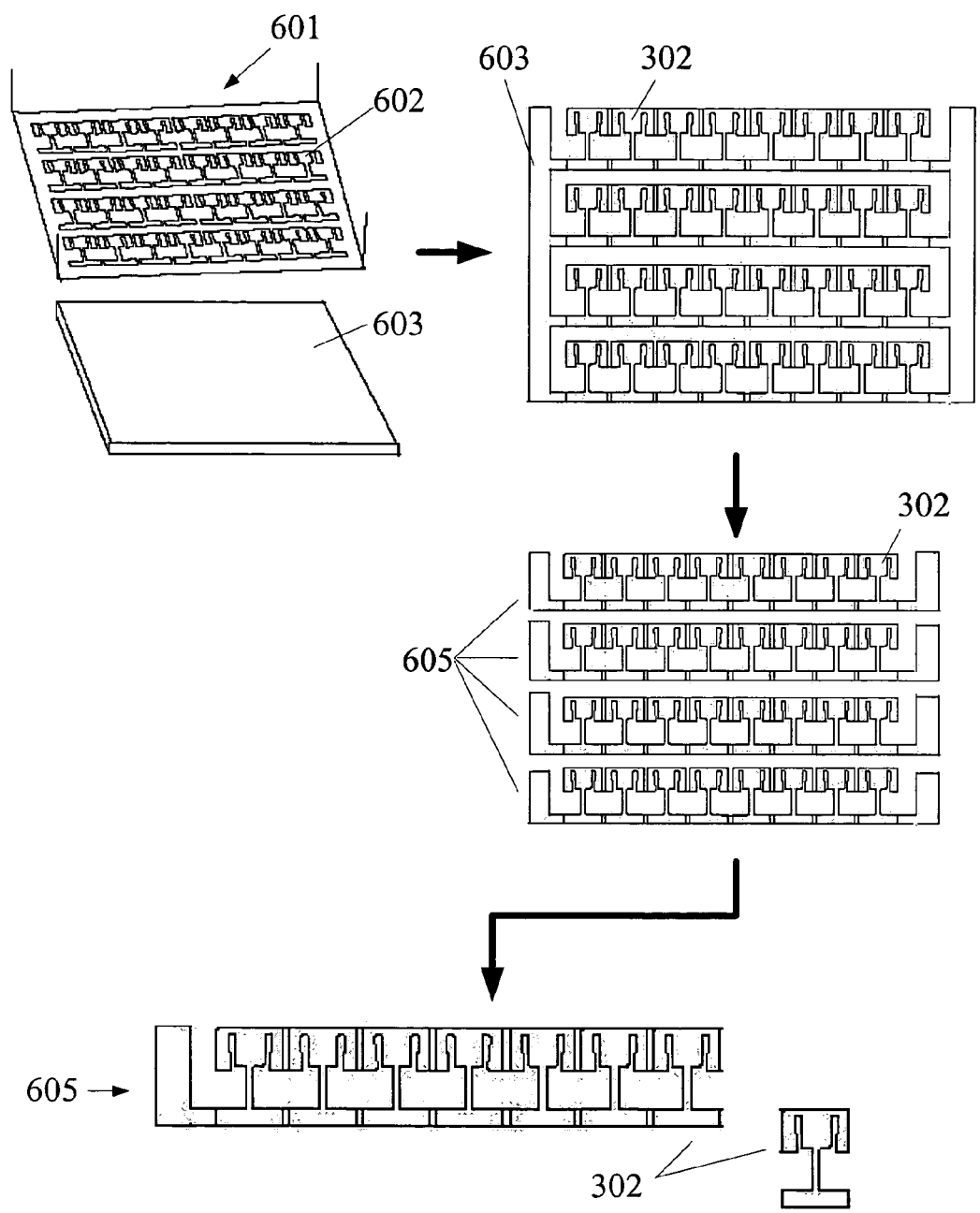
FIGS. 5–8 show a manufacture process of a support base according to four different embodiments of the present invention.

Referring to FIG. 5, the manufacturing process of the support base 302 comprises the following steps: (1) die punching a stainless steel sheet 603 to a single unit T-shaped support base; (2) fixing the single unit T-shaped support base to a cutting fixture and cutting it to single T-shaped support bases 302; and (3) cleaning and inspecting the single T-shaped support bases 302.

In the embodiment, a tooling die 601 with a multi-unit T-shaped support base cutter 602 is used to punch the stain steel sheet 603, after punching, the sheet 603 is made into a sheet frame with many single unit T-shaped support base 302, the sheet frame is then cut into a single bar 605 and then separated into single T-shaped support bases 302.

Figure 6:
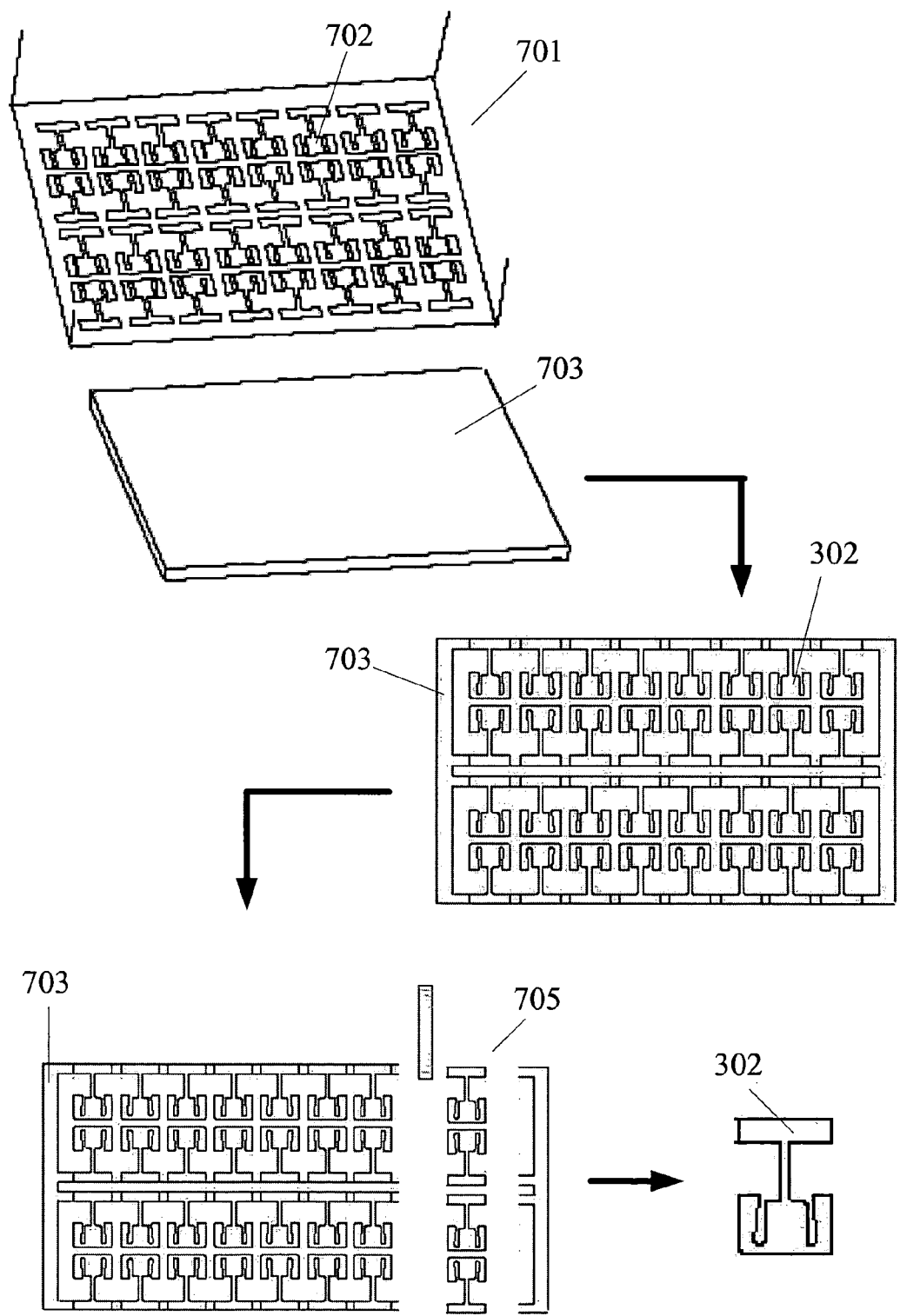

FIG. 6 shows another tooling die 701 with a multi-unit T-shaped support base cutter 702, which is used to punch the stainless steel sheet 703. After punching, the sheet 703 is made into a sheet frame with many single unit T-shaped support bases 705, and the sheet frame is then cut into single T-shaped support bases 302.

EMBODIMENT 2

Figure 7:
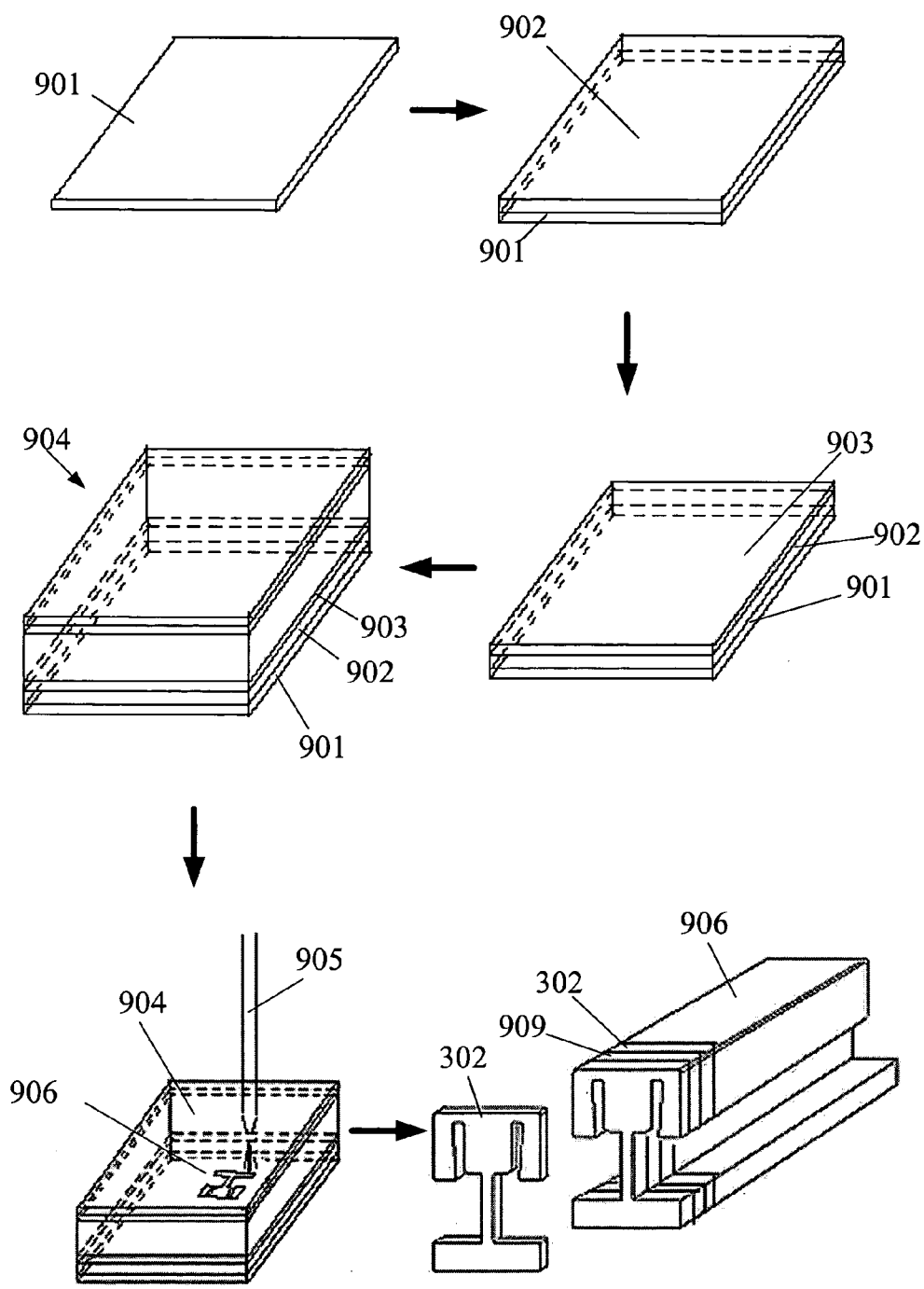

Referring to FIG. 7, another manufacturing process of the support base 302 comprises the following steps: (1) fixing a stainless steel sheet 901 and then laminating a spacer 902 on the stainless steel sheet 901; (2) laminating a second stainless steel sheet 903 on the spacer 902; (3) laminating a second spacer on the second stainless steel sheet; (4) repeating the above-mentioned steps until attaining a multi layer unit 904; (5) fixing the multi layer unit 904 to a suitable fixture and cutting the multi layer unit 904 by laser or x-ray 905 into T-shaped multi layer units 906; (6) removing the spacer and the T-shaped multi layer units 906 are automatically separated into single support bases 302; and (7) cleaning and inspecting the single support bases 302.

EMBODIMENT 3

Figure 8:
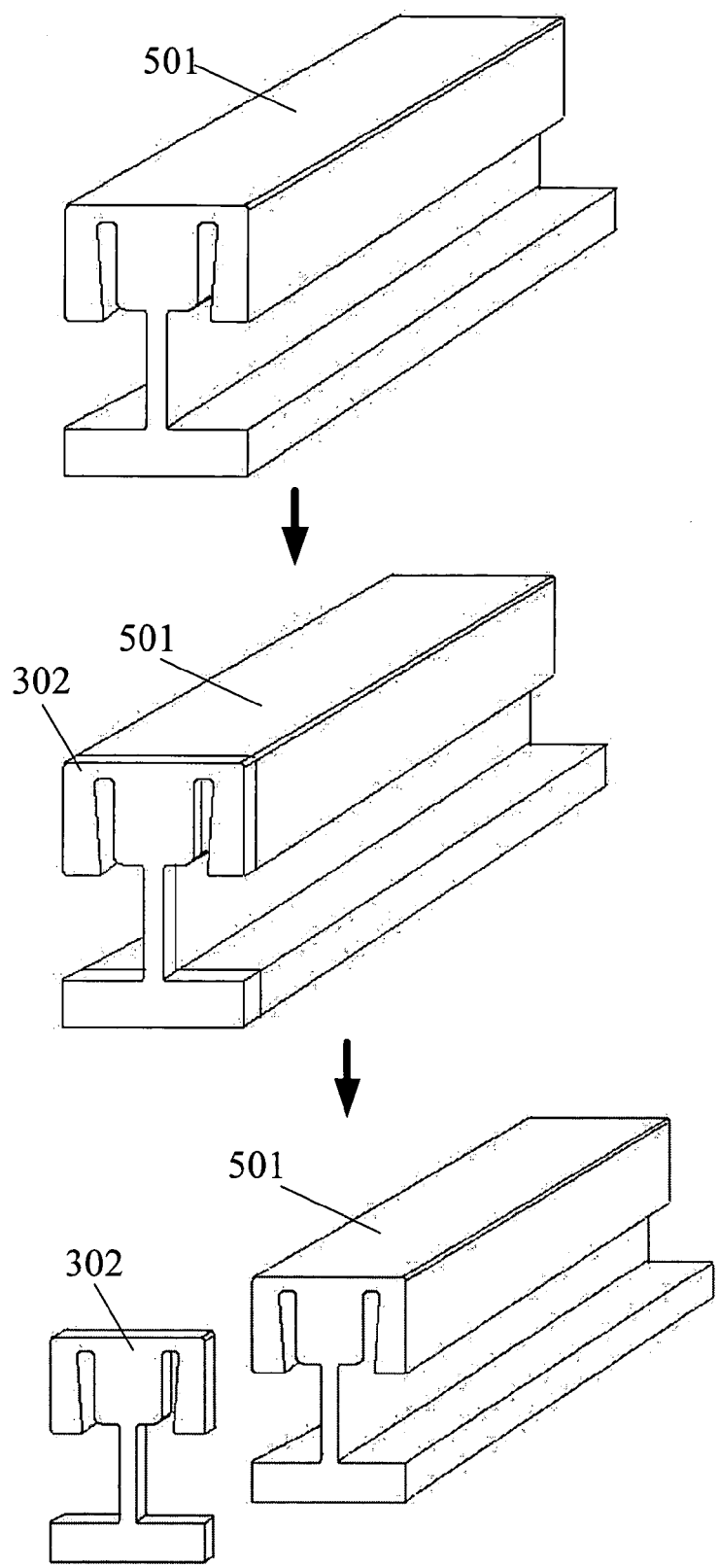
Figure 9:
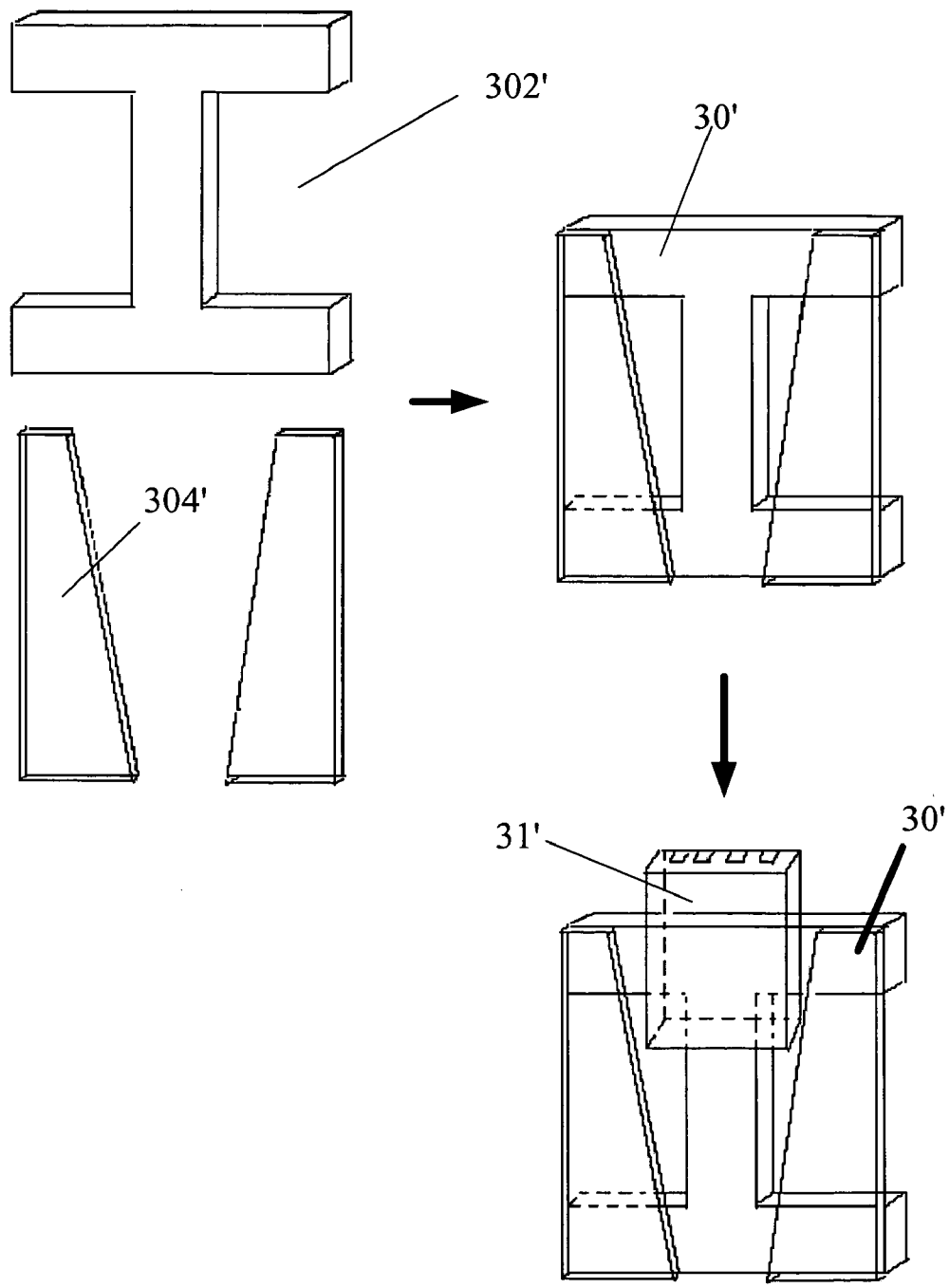
FIGS. 9–12 show another four support bases and micro-actuator with different shapes according to four different embodiments of the present invention.
Figure 10:
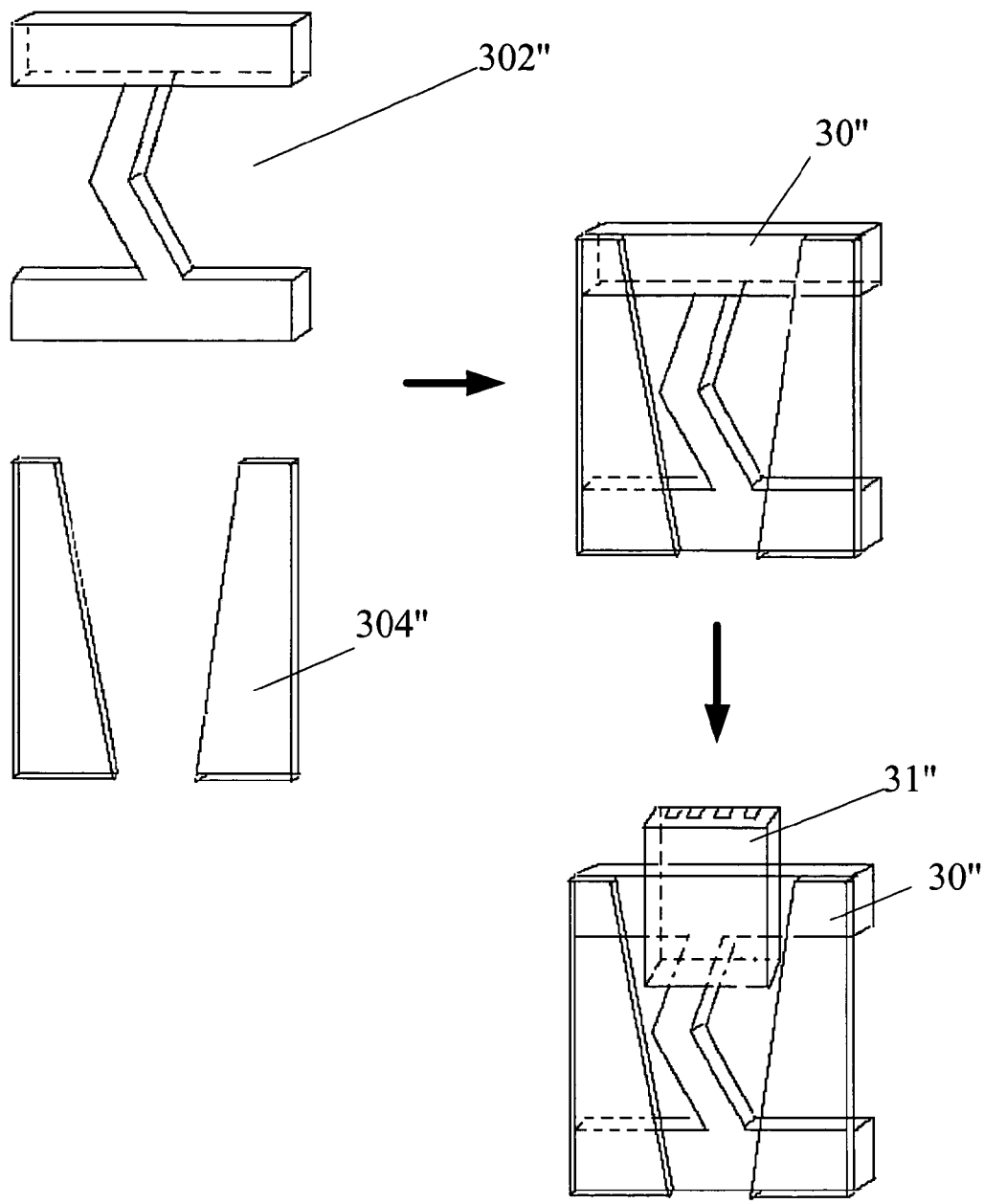
Figure 11:
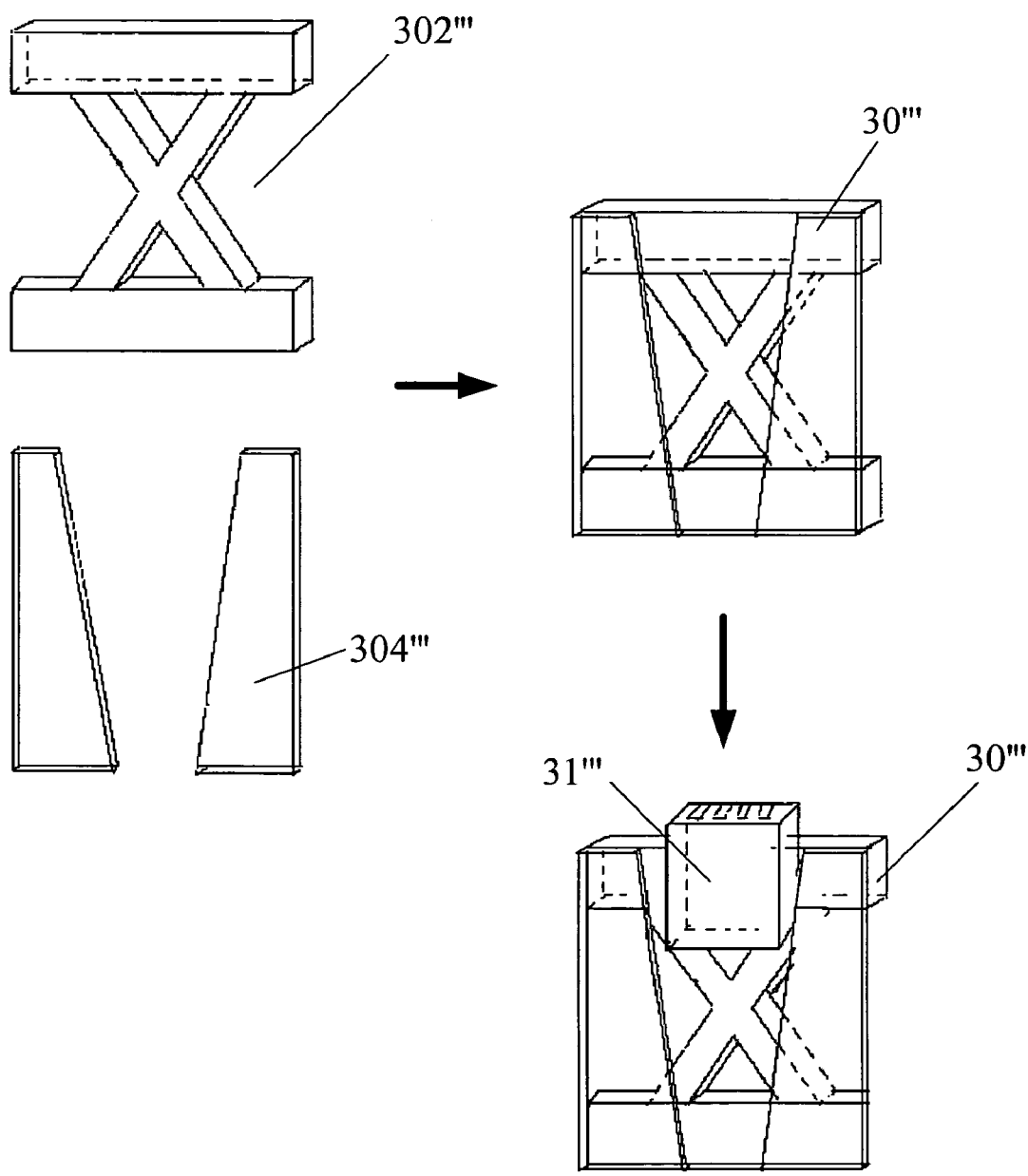
Figure 12:
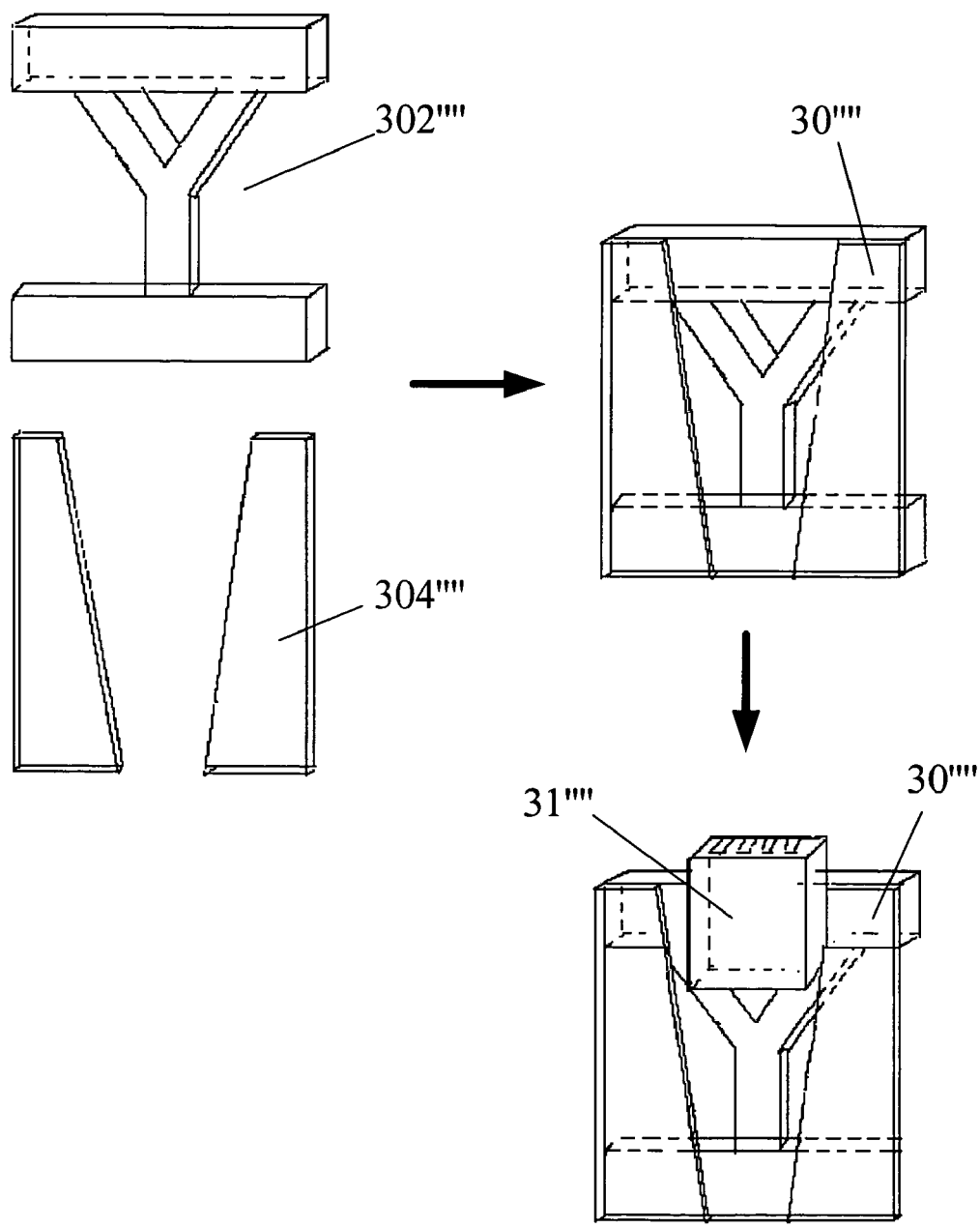

Referring to FIG. 8, another manufacturing process of the support base 302 comprises the following steps: (1) molding a bulk of T-shaped support base bars 501; (2) cutting the T-shape support base bar 501 into single support bases 302 from the T-shaped support base bar 501 by a mechanical method or machining; and (3) separating the support bases 302 from the T-shaped support base bar 501.

Referring to FIGS. 9–12, in the present invention, the support base 302 can be the support bases with other shapes 302', 302'', 302''' or 302'''', and accordingly be made into micro-actuators with different shapes.

In the present invention, because a process of assembling the micro-actuator and HGA is well known to persons ordinarily skilled in the art, a detailed description of such assembly is omitted herefrom. In addition, the thin film PZT pieces 303 can also be ceramic PZT pieces.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A head gimbal assembly comprising:
a slider having a read\write sensor;
a suspension to load the slider;
a micro-actuator; wherein
the micro-actuator comprises a piezoelectric unit with two piezoelectric elements and a support base having a base to be coupled with the suspension physically, a moving plate to be coupled with the two piezoelectric elements, and a leading beam to connect with the base and the moving plate;
wherein the two piezoelectric elements have three electrical pads consisting of two voltage applied pads and a ground pad shared by the two piezoelectric elements.

2. The head gimbal assembly as claimed in claim 1, wherein the base, the moving plate and the leading beam are made from one piece of seamless material.

3. The head gimbal assembly as claimed in claim 2, wherein the seamless material is metal.

4. The head gimbal assembly as claimed in claim 1, wherein the leading beam has a structure to assist a horizontal movement of the moving plate.

5. The head gimbal assembly as claimed in claim 4, wherein the width of the leading beam is narrower than that of the moving plate.

6. The head gimbal assembly as claimed in claim 1, wherein the piezoelectric element is a thin film piezoelectric piece or ceramic piezoelectric piece.

7. The head gimbal assembly as claimed in claim 1, wherein the suspension comprises a flexure having a suspension tongue which has a plurality of electrical pads disposed on a predetermined position thereof corresponding to the electrical pads on the two piezoelectric elements.

8. The head gimbal assembly as claimed in claim 7, wherein the base of the micro-actuator electrically couples with the electrical pads and physically couples with the flexure by anisotropic conductive film.

9. The head gimbal assembly as claimed in claim 1, wherein the moving plate of the support base physically and electrically couples with the slider by anisotropic conductive film or adhesive bonding.

10. A micro-actuator comprising:
a piezoelectric unit with two piezoelectric elements; and
a support base; wherein the support base has a base, a moving plate to be coupled with the two piezoelectric elements, and a leading beam to connect with the base and the moving plate;
wherein the two piezoelectric elements have three electrical pads consisting of two voltage applied pads and a ground pad shared by the two piezoelectric elements.

11. The micro-actuator as claimed in claim 10, wherein the base, the moving plate and the leading beam are made from one piece of seamless material.

12. The micro-actuator as claimed in claim 11, wherein the seamless material is metal.

13. The micro-actuator as claimed in claim 10, wherein the two piezoelectric elements are two thin film piezoelectric pieces or ceramic piezoelectric pieces.

14. A method of forming a micro-actuator comprising the steps of:
(1) forming a piezoelectric unit having two piezoelectric elements;
(2) forming a support base having a base, a moving plate, and a leading beam to connect with the base and the moving plate; and
(3) bonding the piezoelectric unit to one side of the support base;
wherein step (2) comprises the following steps: (a) forming a set of the support bases; and (b) dividing the set of the support bases into a single support base;
wherein step (a) is performed by one of the following methods:
(A) die punching a raw sheet to a set of the support bases;
(B) forming a multi-layer sheet consisted of raw sheet and spacer sheet alternately and cutting the multi-layer sheet to a set of the support bases; and
(C) molding a bulk of support base bars having a set of the support bases.

15. A method of forming a head gimbal assembly comprising the steps of:
(A) forming a slider, a suspension and a micro-actuator, wherein forming the micro-actuator comprises: forming the piezoelectric unit having two piezoelectric elements; forming a support base having a base, a moving plate, and a leading beam to connect with the base and the moving plate; and bonding the piezoelectric unit to one side of the support base;
(B) coupling the micro-actuator physically and electrically with the slider by anisotropic conductive film or adhesive bonding; and
(C) electrically bonding the slider to the suspension by gold ball bonding or solder bump bonding.

* * * * *